United States Patent [19]

Lewallen

[11] 4,284,286
[45] Aug. 18, 1981

[54] COMBINATION HANDTRUCK AND PORTABLE WORK TABLE

[76] Inventor: Charles D. Lewallen, Rte. 2, Box 1075, Corbett, Oreg. 97109

[21] Appl. No.: 63,080

[22] Filed: Aug. 2, 1979

[51] Int. Cl.³ .................................................. B62B 1/12
[52] U.S. Cl. .................................... 280/30; 280/47.18; 280/47.2; 280/47.28; 280/654
[58] Field of Search ...................... 280/30, 47.2, 47.18, 280/47.28, 47.27, 42.29, 655, 654, 652, 651

[56] References Cited

U.S. PATENT DOCUMENTS

| | | | |
|---|---|---|---|
| 1,100,702 | 6/1914 | Holmes | 280/47.2 X |
| 3,930,663 | 1/1976 | Scripter | 280/639 |
| 4,106,590 | 8/1978 | Tarran | 280/30 X |

FOREIGN PATENT DOCUMENTS 125961  8/1947  Australia ................................. 280/47.2

Primary Examiner—Joseph F. Peters, Jr.
Assistant Examiner—Milton L. Smith
Attorney, Agent, or Firm—Chernoff & Vilhauer

[57] ABSTRACT

A handtruck having a collapsible supporting surface adaptable for converting the handtruck into a portable work table. The handtruck is provided with a toe blade extender pivotal between folded and operative positions adjacent to the standard toe blade of the handtruck. The toe blade extender has dual functions. First, in its operative position parallel to and in abutment with the toe blade, it enables the handtruck to handle bulky loads. Second, in an intermediate position between its folded and operative positions, it serves as a support for a planar supporting surface which is pivotally attached to the handtruck frame at the opposite end thereof from the toe blade extender and serves as a work table when pivoted away from the handtruck frame and supported by the toe blade extender.

5 Claims, 5 Drawing Figures

COMBINATION HANDTRUCK AND PORTABLE WORK TABLE

BACKGROUND OF THE INVENTION

This invention relates to handtrucks, and particularly to handtrucks with a collapsible supporting surface or table element.

Conventional handtrucks generally comprise a U-shaped or O-shaped main frame with a handle at one end and an axle with wheels and a toe blade generally perpendicular to the frame at the other end. The use of toe blade extenders on handtrucks to facilitate the handling of bulkier items is also a conventional feature. Handtrucks with collapsible platforms attached thereto are also known. See, for example, U.S. Pat. Nos. 454,461, 2,430,107 and 2,784,004. In the last-mentioned patent, the platform is pivotally attached to the frame of the handtruck and horizontally supported at a right angle to the frame by a collapsible leg structure. In this manner, the platform may be used as a working table. The primary drawbacks of this type of construction are that: the collapsible leg structure adds considerable weight to the handtruck, making it difficult to hoist it manually in and out of trucks or otherwise manipulate it; the perpendicularly extending work surface is of limited area, and requires a much more extensive and heavy collapsible leg structure to support any increase in area; and the work surface must be tilted in order to move the device, thus necessitating removal of objects or tools that would otherwise fall off.

SUMMARY OF THE INVENTION

It is a primary object of the present invention to provide an improved combination handtruck and portable work table.

Another object of the present invention is to provide a combination handtruck and portable work table which has an exceptionally large work table area while being simple in design and exceptionally lightweight.

Another object of the present invention is to provide a combination handtruck and portable work table in which the work surface maintains its horizontal position while the device is being moved.

Another object of the present invention is to provide a combination handtruck and portable work table which is capable of transporting extra bulky loads.

According to the present invention, a combination handtruck and portable work table is provided by pivotally attaching a toe blade extender to the toe blade end of the frame of a conventional handtruck and utilizing the toe blade extender not only for the handling of bulky loads but also as a vertical support for a work surface which is pivotally attached to the frame and supportable at an acute angle with respect thereto, the frame itself being supportable at a substantially equal acute angle relative to the ground by a collapsible strut, preferably with a wheel at the end thereof. In this manner, the conventional toe blade extender is converted to a second function—that of a support for a horizontal work surface, without added weight or structure. The acute frame angle relative to the horizontal plane of the ground and work surface enables a much larger work surface area than would be possible if the frame were perpendicular to the horizontal plane during support of the work surface, without adversely affecting stability or requiring additional heavy supporting structure for the work surface. Furthermore, the handtruck with these features may be converted into a mobile work table that can be moved about while loaded without tilting the work surface.

DETAILED DESCRIPTION OF THE INVENTION

Figure 1:
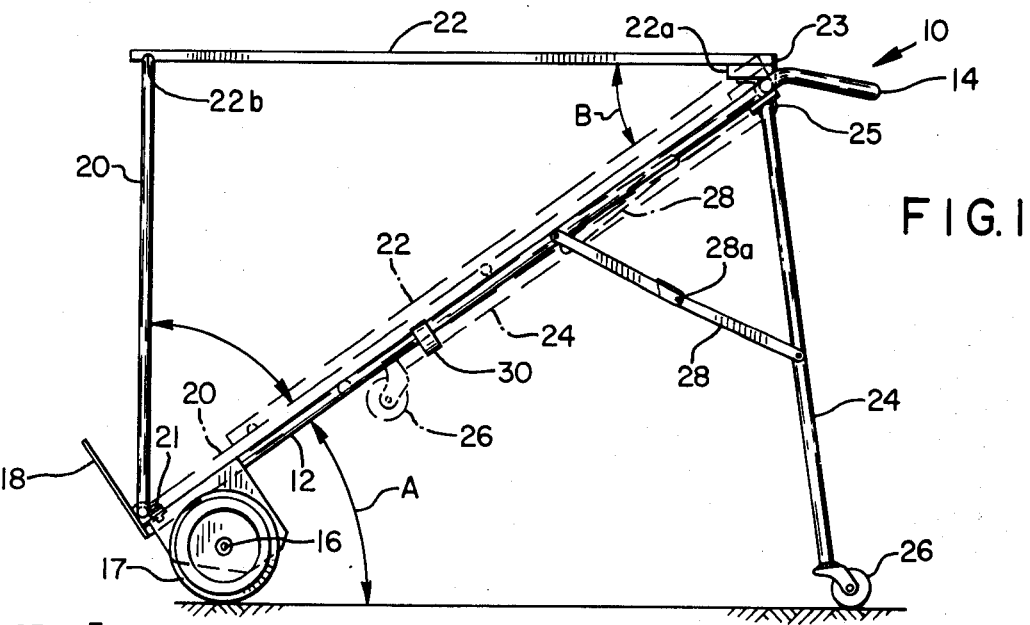
FIG. 1 is a side view of the handtruck of the present invention with the working surface raised into place and the struts extended so as to form a work table.

Referring now to the drawings, a handtruck 10 is shown with a U-shaped main frame 12 having cross members 13, a handle 14 at one end, and an axle 16 with wheels 17 and a toe blade 18 at the other end. A toe blade extender 20, having a top edge 20a and center bar 20b, is shown pivotally attached to the frame 12 by strap hinges 21, and is pivotal between a folded position as shown in solid lines in FIG. 4 and an operative position as shown in dotted lines in FIG. 4 for handling bulky loads. It also has an intermediate position as shown in solid lines in FIG. 1 for purposes to be described hereafter.

A supporting pair of struts 24 formed from a U-shaped frame with a cross brace 24a is pivotally attached to the frame 12 by hinge straps 25, and has a pair of locking caster wheels 26 and a pair of collapsible braces 28 foldable at a pivot point 28a attached thereto. Spring clips 30 are provided for fastening the struts 24 to the frame 12 when not in use. The struts 24 are useful in transporting a load when it is desired to leave the handtruck and load unattended temporarily without depositing the load. In the present invention the struts also serve a second purpose, to be described hereafter.

Figures 2, 3, 5:
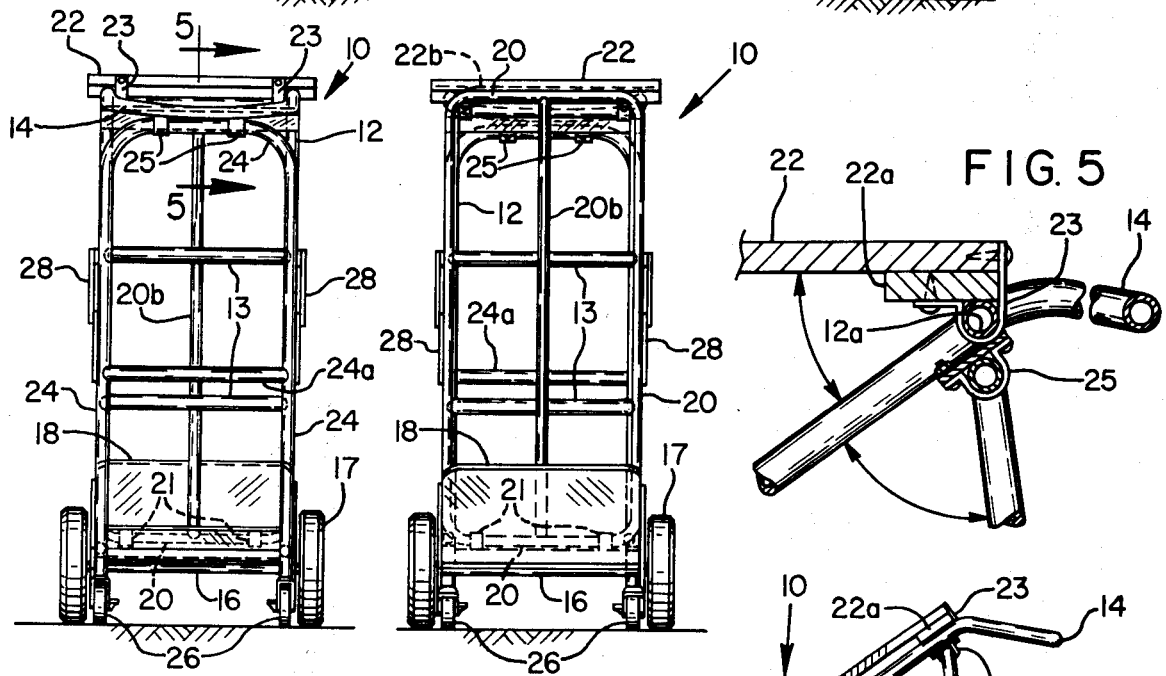
FIG. 2 is a view from the rear of the handtruck of FIG. 1.
FIG. 3 is a view from the front of the handtruck of FIG. 1.
FIG. 5 is an enlarged sectional view of the handle end of the handtruck of the present invention, taken along line 5—5 of FIG. 2.
Figure 4:
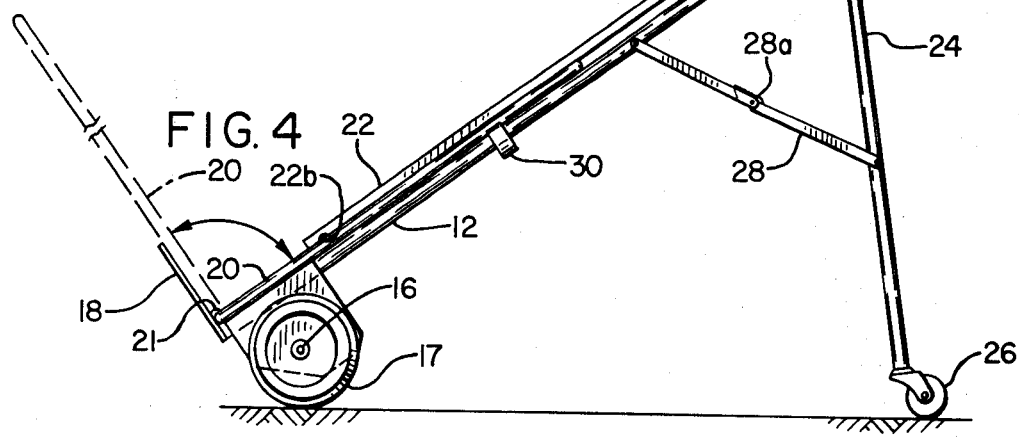
FIG. 4 is another side view of the handtruck of the present invention with the working surface and pivotal toe extender shown collapsed against the frame.

A planar, rigid work surface 22, preferably formed of plywood, is pivotally connected to a crossbar 12a of the frame 12 by simple hinge straps 23 such as shown in FIG. 5. Note that a spacer 22a is provided to allow the toe blade extender 20 to fold down first against the frame 12, the work surface 22 resting on top of the toe blade extender as shown in FIG. 4 when neither is in use. The work surface has a notch 22b at the end opposite the hinge 23 for securely engaging the top edge 20a of the toe blade extender 20. This permits the handtruck to serve as a work table as shown in FIG. 1 and as more fully described hereafter.

During transport of a load, the toe blade extender 20 may be pivoted up from the frame to coincide with the angle of the toe blade 18 as shown in dotted lines in FIG. 4 to accommodate bulky loads such as sheet rock, insulation or other building materials. The work surface 22 meanwhile is pivoted downward against the frame 12 to support the load. The strut bracing members 28 are normally in a folded position to allow the struts 24 to be held against the frame 12 by spring clips 30, best seen in FIG. 1, thereby allowing mobility of the load. However, the handtruck and load may be temporarily left unattended by unfolding the struts 24 to the positions shown in the figures without depositing the load, if needed.

After unloading, the handtruck may be utilized as a work table for assembling, handling or otherwise processing the load, or for other purposes, by swinging the struts 24 out from the frame (thereby straightening the strut braces 28) so that they support the frame 12 at an acute angle A (FIG. 1) to the ground, pivoting the work surface 22 upwardly to a horizontal position through a substantially equal acute angle B relative to the frame 12, and pivoting the toe blade extender 20 to a substantially vertical position so that it engages the notch 22b provided in the bottom of the work surface, thereby supporting the work surface horizontally. In this manner, the toe blade extender forms the third leg of a rigid triangle structure which provides a solid support for the table or work surface. Because the wheels 17 of the handtruck and the caster wheels 26 at the ends of the struts 24 are in contact with the ground or floor, the work table may be moved from place to place without tilting. In order to secure it in a stationary position, the locking casters may be engaged. The positions of the wheels 17 and casters 26 adjacent each end of the work surface 22 ensure that the work surface cannot be rendered unstable by placing heavy objects thereon adjacent its ends.

The nature, scope, utility and effectiveness of the present invention have been described and specifically exemplified in the foregoing specification. The terms and expressions which have been employed in the foregoing abstract and specification are used therein as terms of description and not of limitation, and there is no intention, in the use of such terms and expressions, of excluding equivalents of the features shown and described on portions thereof, it being recognized that the scope of the invention is defined and limited only by the claims which follow.

What is claimed is:

1. In a handtruck having an elongate main frame with a handle at a first longitudinal end thereof and a toe blade and pair of wheels at the opposite longitudinal end thereof, the improvement comprising:

(a) a rigid, generally planar surface attached by a first pivotal connection to said main frame so as to pivot about an axis generally perpendicular to the longitudinal dimension of said main frame, said surface extending from said first pivotal connection toward said opposite end of said main frame;

(b) a toe blade extender comprising a rigid elongate frame attached by a second pivotal connection to said main frame adjacent said opposite end thereof so as to pivot about an axis generally perpendicular to the longitudinal dimension of said main frame;

(c) means for limiting the pivotal movement of said toe blade extender about said second pivotal connection so as to permit movement thereof only between a first pivotal position, wherein said extender is substantially parallel to said main frame and extends from said second pivotal connection toward said first longitudinal end of said main frame, and a second pivotal position wherein said extender is substantially perpendicular to said main frame and extends therefrom substantially parallel to and in abutment with said toe blade;

(d) cooperative means on said planar surface and toe blade extender respectively for permitting said toe blade extender to be selectively engaged with said planar surface such that said toe blade extender supports said planar surface at a first acute angle relative to said main frame while holding said toe blade extender in an intermediate pivotal position between said first and second pivotal positions respectively; and (e) ground-engaging support means on said main frame for supporting said main frame, in cooperation with said pair of wheels, at an acute angle relative to the ground substantially equal to said first acute angle such that said planar surface is thereby supported substantially parallel to the ground.

2. The handtruck of claim 1 wherein said first pivotal connection is located adjacent said first longitudinal end of said main frame.

3. The handtruck of claim 1 wherein said support means includes wheel means thereon for engaging the ground and thereby permitting mobility of said handtruck and planar surface while said planar surface is supported in said position parallel to the ground.

4. The handtruck of claim 1 including means movably mounting said support means on said main frame so as to permit said support means to be selectively moved to a non-supporting position with respect to said main frame.

5. The handtruck of claim 1 wherein said support means includes means for engaging the ground at a location substantially longitudinally coextensive with said first pivotal connection.

* * * * *